J. P. CRUTCHER.
Cotton-Planter.
No. 23,554.
Patented Apr. 12, 1859.
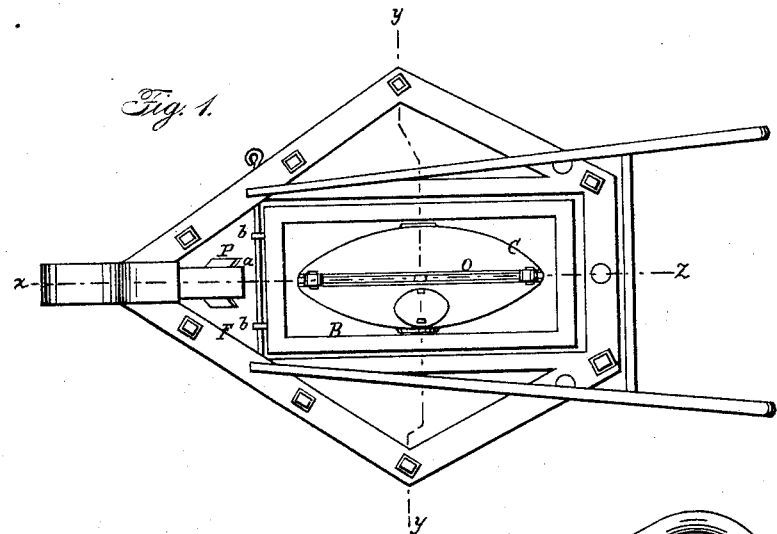
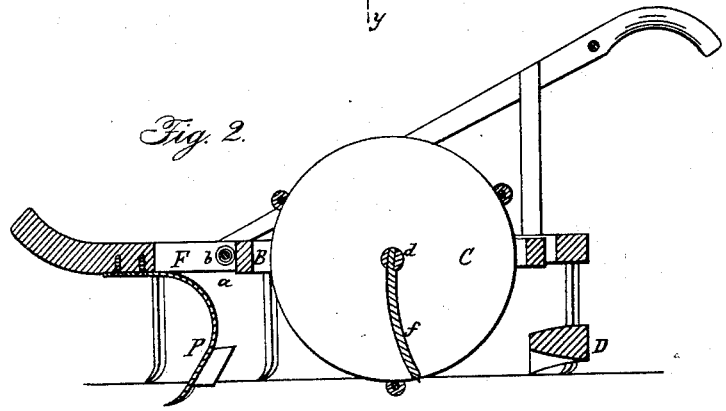
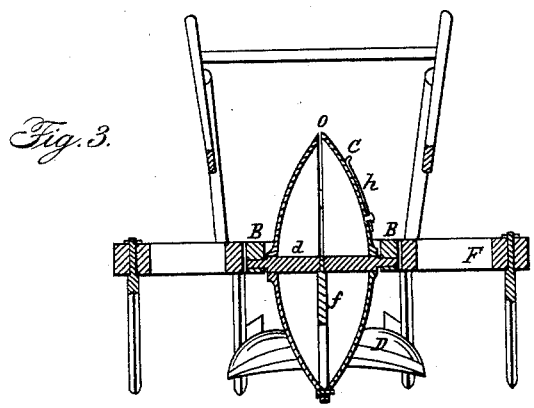
Witnesses:
O. L. Martin
J. A. Anthony
Inventor:
J. P. Crutcher

UNITED STATES PATENT OFFICE.

J. P. CRUTCHER, OF SILVER SPRING, TENNESSEE.

IMPROVEMENT IN COTTON-SEED PLANTERS.

Specification forming part of Letters Patent No. 23,554, dated April 12, 1859.

*To all whom it may concern:*

Be it known that I, J. P. CRUTCHER, of Silver Spring, in the county of Wilson and State of Tennessee, have invented a new and useful Improvement in Cotton-Seed Planters; and I do hereby declare that the following is a full, clear, and exact description of the same, reference being had to the annexed drawings, forming part of this specification, in the several figures of which similar characters of reference denote the same part.

Figure 1 is a top view of the planter. Fig. 2 is a vertical section on $x\,x$. Fig. 3 is a vertical cross-section on $y\,y$.

The nature of my invention consists in a certain combination of devices in the construction of cotton-seed planters, hereinafter to be set forth.

In the drawings, F is the main frame, of form shown in Fig. 1, within which is hung a secondary frame, B, connected by a bar, $a$, and eyes $b\,b$. The frame B contains a hollow rotating seed-chamber, C, made up of two parts, mounted on a shaft, $d$, so as to leave an opening, $o$, between the edges of the two halves of the chamber for the passage of seed.

Fixed to the shaft $d$ is the clearer $f$, which, as the chamber revolves on the shaft, keeps the soil from clogging the discharge-space $o$.

In the front of the frame is a spring furrow-opener, P, and behind the seed-chamber is the coverer D. The seed is placed in the chamber C by door $h$. The frame B, being attached to the main frame, as above described, allows the chamber C to roll on the bottom of the furrow and drill the seed from the opening $o$.

The clearer $f$ prevents the seed from packing in the chamber, and removes whatever soil may adhere to the edges of the discharge-opening. The coverer completes the operation.

I claim—

The rotating hollow chamber C, constructed as described, in combination with the clearer and agitator $f$ and swinging frame B, substantially as and for the purposes set forth.

In testimony whereof I have hereunto signed my name before two subscribing witnesses.

J. P. CRUTCHER.

Witnesses:
R. H. PATTEN,
J. W. WILSON.